(12) United States Patent
Smith et al.

(10) Patent No.: US 10,078,905 B2
(45) Date of Patent: Sep. 18, 2018

(54) PROCESSING OF DIGITAL MOTION IMAGES

(71) Applicant: Imagineer Systems Ltd., Guildford (GB)

(72) Inventors: John-Paul Colin Smith, Guildford (GB); Dmitrii Borisovich Volegov, Maloyaroslavets (RU)

(73) Assignee: Imagineer Systems Ltd., Guildford (GB)

( * ) Notice: Subject to any disclaimer, the term of this patent is extended or adjusted under 35 U.S.C. 154(b) by 390 days.

(21) Appl. No.: 14/677,818

(22) Filed: Apr. 2, 2015

(65) Prior Publication Data

US 2015/0310623 A1    Oct. 29, 2015

(51) Int. Cl.
 *G06T 7/285* (2017.01)
(52) U.S. Cl.
 CPC ................................. *G06T 7/285* (2017.01)
(58) Field of Classification Search
 None
 See application file for complete search history.

(56) References Cited

U.S. PATENT DOCUMENTS

| | | | | |
|---|---|---|---|---|
| 5,613,048 A * | 3/1997 | Chen | ...................... | G06T 15/205 345/419 |
| 5,854,634 A * | 12/1998 | Kroitor | ................... | G06T 13/00 345/473 |
| 6,606,404 B1 | 8/2003 | Zhang | | |
| 7,907,793 B1 * | 3/2011 | Sandrew | ................... | H04N 9/43 348/576 |
| 8,897,596 B1 * | 11/2014 | Passmore | ........... | H04N 13/0267 358/3.26 |
| 2002/0094135 A1 * | 7/2002 | Caspi | ........................ | G06T 7/20 382/294 |
| 2005/0226502 A1 * | 10/2005 | Cohen | ................ | G06K 9/00711 382/173 |
| 2006/0023073 A1 * | 2/2006 | Li | ...................... | H04N 7/17318 348/211.99 |

(Continued)

FOREIGN PATENT DOCUMENTS

WO    WO 2012/125291 A1    9/2012

OTHER PUBLICATIONS

Kahler, "Rigid motion constraints for tracking planar objects," Springer-Verlag Berlin Heidberg (2007).*

(Continued)

*Primary Examiner* — Jay Au Patel
*Assistant Examiner* — Shadan E Haghani (57) ABSTRACT

A method for processing of motion images based on a first set of motion image frames for a first eye view and at least one image frame for a second eye view. One embodiment of the method can include: identifying an object in a first image frame from the first eye view at a given time t; using a planar tracker, generating a homography relating to apparent movement of the object between the first image frame from the first eye view at the given time to a first image frame from the second eye view at a similar time t'; and using the homography to enhance processing of image(s) in the first and/or the second eye view. Thus, the homography can be used to define the relationship between two views taken at a similar time from two different locations.

20 Claims, 1 Drawing Sheet

(56) References Cited

U.S. PATENT DOCUMENTS

| | | | |
|---|---|---|---|
| 2006/0132610 A1* | 6/2006 | Xin | H04N 19/597 348/207.99 |
| 2011/0058016 A1* | 3/2011 | Hulyalkar | H04N 13/0029 348/42 |
| 2011/0164109 A1* | 7/2011 | Baldridge | H04N 13/0257 348/43 |
| 2012/0063681 A1* | 3/2012 | Sandrew | G06T 11/001 382/167 |
| 2012/0194506 A1* | 8/2012 | Passmore | G06T 15/00 345/419 |
| 2012/0300979 A1* | 11/2012 | Pirchheim | G06T 7/0042 382/103 |
| 2013/0044186 A1* | 2/2013 | Jin | G06T 7/20 348/46 |
| 2013/0156336 A1 | 6/2013 | Suk | |
| 2013/0183023 A1* | 7/2013 | Sandrew | G11B 27/034 386/286 |
| 2013/0266292 A1* | 10/2013 | Sandrew | H04N 9/79 386/282 |
| 2014/0002615 A1 | 1/2014 | Hendricks | |
| 2014/0241576 A1* | 8/2014 | Yu | G06T 7/55 382/103 |
| 2015/0243324 A1* | 8/2015 | Sandrew | G11B 27/031 386/278 |

OTHER PUBLICATIONS

Khan, "A Multiview Approach to Tracking People in Crowded Scenes using a Planar Homography Constraint," Proceedings of the European Conference on Computer Vision (ECCV), pp. IV: 133-146, 2006.*

Wright, Steve, "Compositing Visual Effects—Essentials for the Aspiring Artist," Focal Press, 2013, Chapter 8, pp. 141-164.

Great Britain Search Report for Great Britain Patent Application No. GB1406109.7, dated Oct. 3, 2014.

Marr et al. "A Theory of Human Stereo Vision", Massachusetts Institute of Technology Artificial Intelligence Laboratory, A.I. Memo No. 451, Nov. 1977, 89 pages.

Blanc et al., "X-Splines; A Spline Model Designed for the End-User", LaBRI, Sep. 15, 2015, 10 pages.

* cited by examiner t = n+4 t = n+3 t = n+2 t = n+1 t = n t = n-1

L    R

PROCESSING OF DIGITAL MOTION IMAGES

BACKGROUND OF THE INVENTION

Field of the Invention

The present invention relates to a method for processing of digital motion images, and to relates computer program products and devices.

Description of the Related Art

The production of high quality entertainment material is now a complex process. Up until the 1990's movie making was essentially all done 'in camera'. By this we mean that everything was arranged (actors, set, props, lighting) as it was to be in the final production. With the advent of computer or digital processing of images, a major change happened. Digital processing was introduced for two main reasons. Firstly it could be used to create final images that would be very difficult to physically assemble and film. One example could be the portrayal of 20 feet high monsters. Whilst of course it is possible to build physical model monsters, it is both inconvenient, time consuming and expensive to do so. The second such use of digital effects was to correct imperfections in shooting, or undesired aspects in the shoot. Such a correction may be to alter a character's eye coloring from its natural brown to a chosen shade of blue.

There are currently many commercial products available to digitally alter material that has been shot. Altering the grade (the color balance of material) is often carried out using the Baselight System, from Filmlight Ltd, London UK, or other similar systems. Compositing effects are often achieved using the 'Nuke' system, from The Foundry Visionmongers Ltd, London, UK.

The current application concerns effects applied to individual frames of a moving image, of which rotoscoping is the primary example. Rotoscoping (often abbreviated as "roto") is where an operator effectively 'draws' on a frame of the video or movie. It is often used as a tool for visual effects in live-action movies. By tracing an object, a silhouette (called a matte) is created. The matte can be used to extract the object from a scene for use on a different background or to apply visual effects to the object. Rotoscoping can be used to allow a special visual effect (such as a glow, for example) to be guided by the matte or rotoscoped line. One classic use of traditional rotoscoping was in the original three Star Wars films, where it was used to create the glowing light sabre effect, by creating a matte based on sticks held by the actors. To achieve this, editors trace a line over each frame with the prop, then enlarged each line and added the glow.

Rotoscoping used to be carried out manually with physical drawing, but these days it can be carried out electronically on the digital files. Rotoscoping in the digital domain is often aided by motion tracking software. This assists an operator, by calculating where an object will be in subsequent frames, based on its previous movement characteristics. This means that it is not necessary to manually locate an object of interest in all the frames of a moving image. While blue and green screen techniques have made the process of layering subjects in scenes easier, rotoscoping still plays a large role in the production of visual effects imagery.

One product available that combines motion tracking and rotoscoping is the Mocha® product, produced by Imagineer Systems Ltd, of Guildford, Surrey, UK. This product makes use of planar tracking to track an object in a sequence of frames for a motion image. Planar tracking is described in the book 'Compositing Visual Effects' by Steve Wright, published by Focal Press in 2008, pages 153-157. Planar Trackers are a very useful tool to assist in rotoscoping. They involve the assumption that objects to be tracked are 'planar' (i.e. moving in a 2D plane). Page 156 of the above book teaches how this is done. Using a planar tracker, the relationship over time between a given object can be defined by a homography, which is a matrix transformation relating the assumed planar form of the object in a first frame of the image at a first time, with the assumed planar form of the object in a second frame at a second time.

A popular, and growing, trend in movies and other similar image products is the so-called '3D' Movie (and 3D TV), which uses a stereo image system. Stereo image systems generally work by having two image streams, one for each eye, and displaying them alternately with spectacles that allow only one eye at a time to be view each image stream. This creates the illusion of depth by fooling the eye and creating the illusion of stereopsis (binocular vision). One of the most famous movies using this type of stereoscopic image is 'Avatar', directed by James Cameron. A problem arises with processing technique such as rotoscoping since in stereo movies there are two image streams, and hence there are twice as many source frames, which could be twice as much material to process. This would add substantially to the cost of 'effects heavy' movies, which are currently the most popular for 3D movies.

A simple solution to this is to apply an offset to the object in one image stream compared to the other. One of the two image streams is designated as the 'hero' eye image stream, all processing is applied to the hero eye, and this is mapped to the other eye. However, this does not work well in practice since a simple offset does not allow for change in perspective or depth. By way of example, consider a video image where it is desired to alter the color of an actor's lips. In stereo there are two image streams. If the operator accurately draws around the lips of the actor in a given frame, in (say) the right eye view, it may be expected that the lip shape will be the same in the left eye view. However, this is not the case since the two cameras that are responsible for the two image streams will have a different perspective. There will be an X-axis (horizontal) displacement, which may possibly be corrected by the 'drag and drop' of the shape. However, there will also be a perspective change in the lip shape between cameras and a final contribution to the different shapes is depth. The lips are almost certain to be at different depths to the two cameras. Thus, although a known planar tracking system could be used for one eye's view, the resultant tracking would not provide the required information about the other eye's view even if an offset is applied. The whole tracking process may need to be repeated for the second eye, which would involve undesirably increasing the computing resources and man power required.

A prior art technique for automating the processing of stereo images uses algorithms to determine what is known as a 'disparity map'. The term disparity map refers to the apparent pixel difference or motion between a pair of stereo images. Papers published since at least 1977 have taught how to produce disparity maps. One early publication is 'A Theory of Human Stereo Vision" by D, Marr and T Poggio, November 1977, published by the Massachusetts Institute of Technology Artificial Intelligence Laboratory, as AI memo 451.

With reference to the example of changing the color of an actor's lips, it is possible to build a disparity map using one of the known published techniques, to then use a conventional tracking process to identify points representing the lips (or other object of interest) in images for a first eye and then, via the disparity map, determine the disparity between the eyes on a point by point basis.

There are several problems with the use of disparity maps. Firstly, there are many algorithms for determining a disparity map. The creator of each algorithm typically claims that his algorithms are better than previous algorithms. Secondly, some proposed methods are re-iterative. This means that the process has to be run many, many times, where slight improvements to the answer are made in each iteration. This obviously results in a high burden in terms of computer processing and memory. Thirdly, many disparity maps are non-deterministic and hence for a given physical layout of object and cameras there are many different answer that 'fit' the algorithm.

Most significantly, the use of a disparity map does not reduce the processing burden when dealing with stereo images. The resolution of the disparity map is the same as the resolution of the image. Hence, although a disparity map can allow automation of the processing of stereo images, it does this in a way that is not technically efficient since the data processing burden is not improved. It should also be remembered that with the ever rising resolution that imagery is required to work at, the disparity map will get correspondingly larger. The resolution of a disparity map is the same as the resolution of the image. At 4K resolution the disparity map of one frame may occupy 50 Mbytes or more. The amount of data involved in using this technique for a whole movie, or significant parts of a movie, is therefore enormous. Thus, there are still significant problems to address in this field.

BRIEF DESCRIPTION OF THE DRAWINGS

The invention will be readily understood by the following detailed description in conjunction with the accompanying drawings, in which.

SUMMARY

The present invention relates to methods, computer program products, devices and systems for processing of digital motion images.

As a method for processing of motion images based on a first set of motion image frames for a first eye view and at least one image frame for a second eye view, one embodiment of the method can include at least: identifying an object in a first image frame from the first eye view at a given time t; using a planar tracker, generating a homography relating to apparent movement of the object between the first image frame from the first eye view at the given time to a first image frame from the second eye view at a similar time t'; and using the homography to enhance processing of image(s) in the first and/or the second eye view. Thus, the homography can be used to define the relationship between two views taken at a similar time from two different locations. As a method for processing of motion images, the motion images including a first set of motion image frames associated with a first eye view and a second set of motion image frames associated with a second eye view, another embodiment of the method can include at least: identifying an object in a first image frame from the first set of motion image frames at a given time t; generating a homography relating to apparent movement of the object between the first image frame from the first set of motion image frames and a corresponding first image frame from the second set of motion image frames; and using the homography to enhance processing of one or more of the motion images.

As a data processing apparatus, one embodiment can include at least: memory for storage of image data including a first set of motion image frames for a first eye view and at least one image frame for a second eye view; and a processor configured to identify an object in a first image frame from the first eye view at a given time t, use a planar tracker to generate a homography relating to apparent movement of the object between the first image frame from the first eye view at the given time to a first image frame from the second eye view at a similar time t', and use the homography to enhance processing of image(s) in the first and/or the second eye view.

As a computer readable medium including at least computer program code for processing of motion images, the motion images including a first set of motion image frames associated with a first eye view and a second set of motion image frames associated with a second eye view, one embodiment of the computer readable medium can include at least: computer program code for identifying an object in a first image frame from the first set of motion image frames at a given time t; computer program code for generating a homography relating to apparent movement of the object between the first image frame from the first set of motion image frames at the given time t and a first image frame from the second set of motion image frames at a similar time t'; and computer program code for using the homography to enhance processing of one or more of the motion images.

DETAILED DESCRIPTION OF EMBODIMENTS OF THE INVENTION

The present invention relates to methods, computer program products, devices and systems for processing of digital motion images. Viewed from a first aspect, the invention can provide a method for processing of motion images based on a first set of motion image frames for a first eye view and at least one image frame for a second eye view. The method can identify an object in a first image frame from the first eye view at a given time t; use a planar tracker, generate a homography relating to apparent movement of the object between the first image frame from the first eye view at the given time to a first image frame from the second eye view at a similar time t'; and use the homography to enhance processing of image(s) in the first and/or the second eye view.

The inventors have made the non-obvious realization that, in the context of processing stereo images, a homography can advantageously be used to define the relationship between two views taken at a similar (or same) time from two different locations. In computer image processing any two images of the same planar surface in space can be related by a homography. Known uses of homographies for planar tracking relate to the view from one camera at two distinct intervals of time (for example time t and time t+n). With the above method, planar tracking is used to find a homography relating images taken at a similar time from two separate cameras having different view points. This means that planar tracking techniques can be used to efficiently determine relationships between not only a sequence of images from a single camera, but also between related images taken at similar times from two cameras.

This method is particularly beneficial when processing two sets of image frames representing two eye views in a stereo (3D) moving image. The end result in that case is a method for processing of stereo images that can be efficiently automated with a very low computer processing burden. This can be used for rotoscoping and hence for various image manipulation purposes, such as removal of objects from the image, modification of objects, replacement with another object and so on.

The method also permits any source of images for a second eye view to be used to enhance processing of images in the first eye view. It is common for a film production to involve not only the 'main' camera (or cameras), but also for there to be 'witness' cameras taking both video and still images (e.g., digital SLR). Since these witness images are taken from a different viewpoint then they will contain different information. For example, a different area of the background will be visible behind a foreground object depending on the location of the camera. The proposed method may be used to provide useful information from one or more images for a second eye view when it is desired to remove an object from the final digital image sequence for the first eye view. A suitable homography can allow the background visible in the second eye view to be used to 'fill in' background obscured by the object in the first eye view.

Similarly, images from additional viewpoints can also be used to enhance processing when planar tracking is used for 3D space location within a 2D or 3D image sequence, for example when a computer generated image (CGI) element such as a CGI monster is to be added into a live action sequence. Again, there is additional information in images from a second eye view that can be used to enhance processing of the images from the first eye view and make the insertion of the CGI element more accurate, so that the final image sequence appears more realistic. As with the other examples above, this enhancement may be achieved by use of a suitable homography for a single object shown from two different view points at a similar time.

It will be appreciated that for complex sequences of image manipulations then the technique can be repeated for multiple objects in an image, by the repeated use of planar tracking for each object or image element in order to find multiple homographies. Moreover, further enhancement can in some cases be provided by the use of more than two image sets from more than two viewpoints, and by the use of multiple images taken at different times. For example, the method may be used to allow for enhanced processing of stereo images (e.g., rotoscoping) by homographies relating a first eye view and a second eye view, and also for further enhancement of the stereo images by use of images from a third eye view, such as from a witness camera.

The images used from the first eye view and second eye view are at a similar time in order to ensure that there is no significant movement of the object or other parts of the image. It will be understood that images taken at the same time would be ideal, such that t and t' are the same, and this is may be the case. However, it is not essential for the timing to be identical. It is enough that the times t' and t are substantially the same or similar. In fact, the method can provide useful results provided that the times t' and t are similar to the extent that there is not likely to have been any significant movement of the object of interest, and this may involve time differences that are comparable to the frame rate of the first set of image frames. Thus, the difference between time t and time t' may be less than the period between frames, preferably a half of the period or less.

Advantageously, this means the method allows for processing of images, such as stereo images, from multiple cameras that are not genlocked. This includes images where the synchronization of the images has failed for some reason, as well as situations where it was preferably not to genlock the cameras in the first place.

It is advantageous for the images from the different eye views to have a similar resolution, but this is not essential. Some planar tracking techniques are not particularly sensitive to resolution and hence the proposed homography can be used even when the two images are at different resolutions. Of course, if a lower resolution image, for example from a lower quality 'witness camera', is being used to derive image data for 'filling in' parts of a higher resolution image then there may be some part of the final image after processing that has a reduced resolution. If the images from the different eye views have different exposures or light levels, then this can be corrected for during processing using known techniques.

In some embodiments the method is used for processing of stereo images that include a first set of motion image frames for the first eye view and a second set of motion image frames for the second eye view. The stereo images may have the same frame rate in order that there is a one-to-one mapping of images from the first eye view and the second eye view. With stereo image processing, it is advantageous for a set of homographies to be determined that relate to apparent movement of the object: (i) from the first image frame from the first eye view at the given time t to a second image frame from the first eye view at a different time t+n, (ii) from the first image frame from the first eye view at the given time t to a first image frame from the second eye view at a similar time t', (iii) from the second image frame from the first eye view at the different time t+n to a second image frame from the second eye view at a time t'+n, and (iv) from the first image frame from the second eye view at the time t' to the second image frame from the second eye view at a time t'+n; with each of these four homographies (i) to (iv) being used to enhance processing of the images.

Advantageously, with this set of homographies, the method can include tracking the object from the first image frame from the first eye view at the given time t to the second image frame from the second eye view at the time t'+n by two routes, the first being a combination of homographies for (i) and (iii) and the second being a combination of homographies for (ii) and (iv), wherein the results of the two combinations of homographies are compared and the comparison used to determine if an adjustment is required to the homographies.

Thus, for example, the method involves tracking an object between two consecutive frames for a first eye, and then to a frame for the second eye at a later time, and alternatively tracking the object from a first frame for the first eye to a first frame for the second eye at a similar time, and then between two consecutive frames for the second eye. If the tracked object was perfectly planar, the timing was identical, there were no noise, and no deviation from the plane used in the planar tracker, then there would be only one possible homography for each of (i) to (iv) and result of both routes would be identical.

In practice, the object is generally not truly planar, there is noise, and there may well be deviation from the plane. Differences in the timing for t and t' will also exist. This means that there may be a choice of homographies for the apparent movement of the object between the various different frames. A planar tracker will typically provide what it considers to be the best homography for a give transformation, but it may be that this needs to be adjusted to ensure that the result of (i) and (iii) is identical to the result of (ii) and (iv). It is beneficial to ensure that the outcome of the selected homographies does not depend on the path taken.

It will be understood that in the situation described above there are four frames involved, first eye view at time t, first eye view at time t+n, second eye view at time t' and second eye view at time t'+n. The homographies (i) to (iv) reflect transformations between the different eye views or between frames for the same eye view. In order for all of the homographies to be consistent and to ensure that the same result is obtained no matter what route is taken then it is necessary for any cycle of the four homographies will have a combined homography that is an identity. A cycle of the homographies in this instance is a path taken via the homographies (or their inverse) from a first frame, stepping through the other three frames and back to the first frame, for example a sequence of (i), (iii), (iv)$^{-1}$ and then (ii)$^{-1}$. Thus, in an advantageous method, the homographies (i) to (iv) can be optimized by adjusting them such that the combined homography for a cycle through the four image frames is an identity, or is as close to an identity as possible, for example the optimization process may iterate to a combined homography that is closer to an identity than the original combined homography, but cannot be improved further.

Optimization of the homographies may be carried out using any suitable algorithm. Essentially it is a non-linear least squares problem and can be solved using, for example, iterative methods. One possible method for solving to find the optimized homographies is the Levenberg-Marquardt algorithm. In a preferred embodiment the method used involves observations in a parameter estimation system and weighting of these observations in order to best optimize the homographies. The weights may be based on the number of outlier pixels for a given homography, with a larger number of outliers indicating a less reliable homography and hence being given a lesser weighting.

It is known for 2D image processing to interpolate between key frames so that not all frames require manual input to implement a require change to the image. This interpolation can be used with the method proposed herein, preferably in conjunction with a new technique adapting the interpolation for multi view (e.g., stereo) images. Thus, processing of the images may involve the use of key frames that are edited by user-defined effects, such as rotoscoping, and frames that are not key frames are edited by interpolation from key frames, typically from two key frames that are closest in time to the non-key frame of interest. Often a linear interpolation would be used to find the edit (e.g., a warp) required in each non-key frame based on the edits applied to the two closest key frames.

For multiple sets of motion images from different views it is desirable to designate one view as the hero view and to ensure that changes to the hero view can affect the non-hero view, but that changes to the non-hero view will not affect the hero view. One use for this is to allow a hero view to be 'signed off' before the equivalent processing is applied to the non hero view. In that case it is important for the 'signed off' images to remain unchanged by refinements made in the non-hero view(s). This may be achieved by a method in which when interpolation is used then the nearest key frames in time are used as the basis for interpolation, and these key frames may be in another view provided that the other view is the hero view. This means that processing of the hero view can be 'copied' to the non-hero view, but changes to the non-hero view (for example to account for non-planar effects) do not affect the hero view. If there are key frames that are closer in time to the non-key frame of interest but are in another view that is not the hero view then these key frames are disregarded.

It will be understood that the method may be expanded to include any number of frames for each eye view (or in fact for more than two eye views). In this case the output is a set of homographies mapping corresponding frames from different eye views (i.e. frames at a similar time) and mapping frames occurring sooner or later in sequence for the same eye view. These homographies can be used to take any processing of the primary image sequence from the first eye view (often denoted the 'hero' eye view in the case of stereo video) and warp the secondary image sequence to match. This includes rotoscoping and so on, as described above. The homographies can also be used for other purposes, such as using information from a second eye view, including a non-stereo camera like a witness camera, and using that to derive new information about the primary eye view, for example for 3D mapping or for filling in missing background when an object is removed.

One possible use for the method is to allow for image processing in conjunction with correction for camera movement and/or lens distortion in stereo images. In order to present the best possible '3D' image it is necessary for the images in both eye views to be very similar. This is to replicate stereopsis to trick the viewer's eyes into 'seeing' depth. Typically this requires cameras with a fixed relationship to one another, i.e. the same distance apart and the same angulation. It also requires cameras with similar lenses, preferably identical lenses. However, this set-up can be costly, difficult to achieve in practice and the cameras can be knocked out of alignment during use. The current method can be used to correct for lens distortion and/or misalignment in order to provide an improved stereo image from mismatched and/or misaligned cameras.

For example, to avoid the expense of a paired set of lenses, a comparison can be made between two non-identical lenses to be used for taking stereo images and differences can be recorded, such as a greater degree of distortion (e.g., barrel distortion) for one lens compared to another. In this case the method may include measurement of the lens distortion individually in each view, with the necessary corrections being applied to that view. The proposed planar tracking and homography method can be utilized in conjunction with these corrections to make further adjustments in which any new elements are distorted to follow the corrections required for lens distortion. Thus, the proposed method using homographies can be easily used in combination with correction for lens distortion.

On the other hand, if the cameras used for stereo images are not correctly aligned or become misaligned then again all images of one eye view would ideally be corrected to negate the effect of the misalignment. In this case the proposed method can be used to make an adjustment to correct for a persistent misalignment that would otherwise affect the viewing experience. In addition, when a misalignment is varying from frame to frame then the planar tracker will automatically cope with this movement since it will be treated as if it is just another part of the perceived camera motion between frames and/or between different view points.

Subsequently to any corrections, the now corrected stereo images can be processed using the same homographies, for example by rotoscoping and so on. The proposed techniques essentially result in 'tracking' an object between two stereo images taken at similar times and this allows any known processing technique used for 2D images to be adapted and used for 3D images with only a very small additional processing burden. The only extra computing power required is for generation and manipulation of the homographies, which are simple matrices. One example of a planar tracker that is considered particularly beneficial when used with the methods described above is the Mocha® product as produced by Imagineer Systems Ltd, of Guildford, Surrey, UK. However, any known planar tracker can be used.

In a second aspect, the invention provides a computer program product comprising instructions that, when executed, will configure a data processing apparatus to carry out the method of the first aspect or any additional/optional feature thereof.

The invention also extends to a data processing apparatus configured to carry out the method of the first aspect. Hence, a data processing apparatus may comprise: memory for storage of image data including a first set of motion image frames for a first eye view and at least one image frame for a second eye view; and a processor configured to identify an object in a first image frame from the first eye view at a given time t; use a planar tracker to generate a homography relating to apparent movement of the object between the first image frame from the first eye view at the given time to a first image frame from the second eye view at a similar time t'; and use the homography to enhance processing of image(s) in the first and/or the second eye view.

The apparatus may be configured to carry out any or all of the other steps discussed above in relation to the method of the invention.

Figure 1:
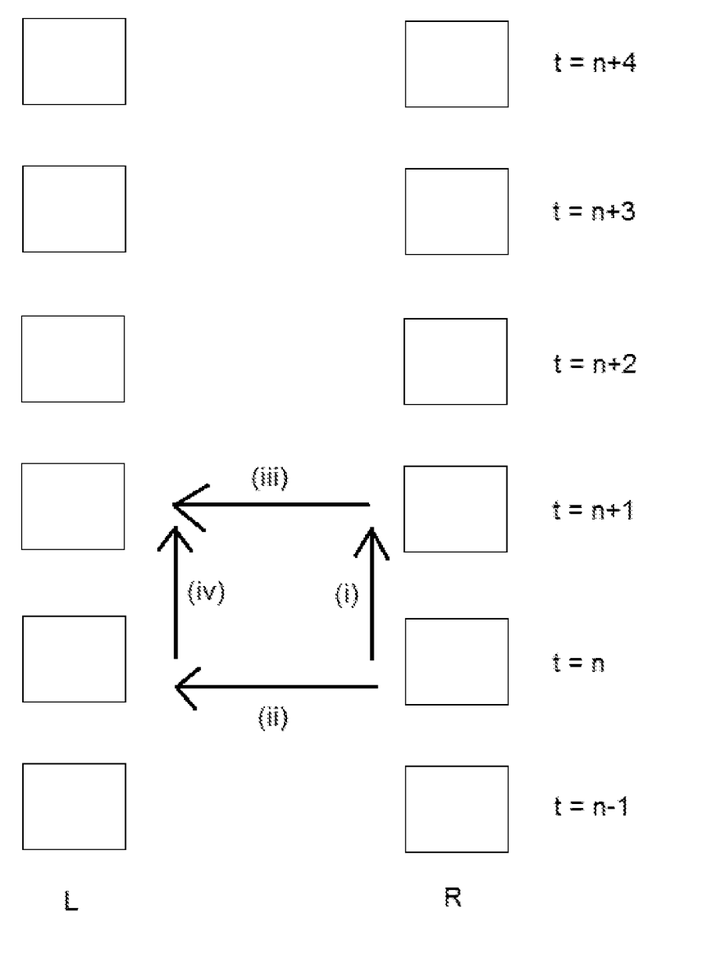
FIG. 1 illustrates a sequence of frames for stereo video with a left eye view L and corresponding right eye view R having frames from time t=n−1 to time t=n+4.

Certain advantageous embodiments will now be described by way of example only and with reference to the accompanying FIG. 1, which illustrates a sequence of frames for stereo video with a left eye view L and corresponding right eye view R having frames from time t=n−1 to time t=n+4 and an example cycle of homographies (i) through (iv) that relate left L and right R frames at time t=n and t=n+1.

It will be understood that the definition of the time t=0 is one of convenience and this could be any point during a sequence of frames. Furthermore, the system described herein can of course be applied at t=n for any value of n and for any total number of frames. The references to particular values for n given in the examples described below and in the FIGURE are, again, simply for convenience and are not intended to describe or imply any limitation on the frames that are processed by means of the proposed system.

The preferred embodiment will be described in relation to the processing of stereo images of the type used for '3D' movies. It will however be appreciated that the same principles can be applied, as explained above, to other situation where there are images of the same scene from multiple viewpoints at the same, or a similar, time. In particular, the multiple image frames from the second eye view could be just a single image, used for enhancing processing of one or more image frames from the first eye view, for example to fill in background when removing an object from the first eye view. The method relies on the use of a homography as in known 2D planar tracking, but with the homography representing the transformation between two views at a similar time rather than between two frames from a single viewpoint at different times.

Let us consider the properties of Homographies. In higher dimensions Homogeneous coordinates are used to represent projective transformations by means of matrix multiplications. With Cartesian coordinates matrix multiplication cannot perform the division required for perspective projection. In other words, with Cartesian coordinates a perspective projection is a non-linear transformation.

Given:

$$p_a = \begin{bmatrix} x_a \\ y_a \\ 1 \end{bmatrix}, p'_b = \begin{bmatrix} w'x_b \\ w'y_b \\ w' \end{bmatrix}, H_{ab} = \begin{bmatrix} h_{11} & h_{12} & h_{13} \\ h_{21} & h_{22} & h_{23} \\ h_{31} & h_{32} & h_{33} \end{bmatrix}$$

Then:

$$p'_b = H_{ab} p_a \text{ where } H_{ba} = H_{ab}^{-1}.$$

Also:

$$p_b = p'_b / w' = \begin{bmatrix} x_b \\ y_b \\ 1 \end{bmatrix}$$

In the matrix $H_{ab}$, the parameters $h_{11}$ to $h_{33}$ all have physical meaning relating to the transformation of the (assumed) planar object. For example, $h_{31}$ and $h_{32}$ relate to perspective transformation, and $h_{13}$ and $h_{23}$ relate to the (x,y) translation. Other parameters in this matrix relate to scaling, rotation, and shear. The inventors have realized that these parameters can be used to define transformations between two frames showing different viewpoints at the same time as well as between two frames from the same view point at different times.

In an example using stereo images the operator will load into his system two image sequences, where one sequence is designated the 'hero' view. Note that the 'hero view' is the eye view file to be kept intact, whilst alterations will be made to the other eye view file. The hero view is commonly the left eye file. However, to avoid confusion, here we will work with the nomenclature that one eye channel is chosen to be the 'hero' or unmodified channel, and the other channel is referred to as the non-hero channel.

The operator may then designate an area of the hero view by drawing around the object to be tracked. This can be done by many methods, for example by drawing using a series of control points, and generating the shape to be used using preferably X-Spline techniques, or Bézier curves. Quintic X-Splines are described in the 1995 Siggraph paper 'X-Splines: A Spline Model Designed for the End-User' by Carole Blanc and Christophe Schlich, published as Proc SIGGRAPH '95, Computer Graphics, p 377-386. Thus at this point we have a shape drawn around an object on one frame, in one eye view. This shape is 'editable' by the use of control points for the splines.

In the simplest case, we choose a later frame than the initial frame, the operator will draw around the same object again. In other more practical cases we will just track the initially drawn object onto later frames without drawing it on later frames.

The tracking software is then enabled. Essentially at this point we are viewing the same plane containing the object to be tracked, from two different perspectives (camera views). The input to the planar tracker consists of two frames, which can either be left frame (L), t=1 and left frame (L), t=2, or left frame (L), t=1 and right frame (R), t=1. This example makes the assumption that the times of the frames in each eye view are identical, i.e. genlocked cameras, although in practice the method will work with small variations in the timing of the frames from different view points and hence for the second eye view the time t could be substituted by a similar time t'. The time period in this case is the period for one frame, but it could be a multiple of this period to 'skip' intervening frames in some situations. The planar tracker can generate an appropriate homography in each case: (i) the L,t=1 to L,t=2 homography, and (ii) the L,t=1 to R,t=1 homography.

This can be repeated with L,t=2 and R,t=1 as the starting frames, to determine (iii) the L,t=2 to R,t=2 homography, and (iv) the R,t=1 to R,t=2 homography. This is illustrated in FIG. 1.

The sequence of homographies between the four frames of interest is denoted the 'Nomography Graph'. If the tracked object were truly planar, and there were no noise, and no deviation from the plane as used in the Planar tracker, then both routes from L,t=1 to R,t=2 (the diagonal between those frames in FIG. 1) would give the same results. The Nomography Graph would hence be self-consistent. In practice, they do not since there will be noise and deviations from planarity and this means that the planar tracker will not generate homographies that provide the desired self-consistency for the Nomography Graph.

It is therefore desirable to adjust the homographies (i) to (iv) to make the Nomography Graph self-consistent. An homography optimization process can hence used to compute the set of adjusted homographies "closest" to the original ones such that the homography computed between any pair of vertices in the Nomography Graph does not depend on the path. It will be understood that the (combined) homography between any pair of vertices does not depend on the path if and only if the homography computed along any simple cycle in the Nomography Graph is an identity. An Nomography Graph meeting the above requirement is termed temporally stable.

The optimization problem is tackled using a calculated state vector for each homography. The state dimensions number 2-9 depending on the 2D tracking model, i.e. translation, affine etc. We make three sets of observations: "similarity", "temporal stability" and "drift compensation". Similarity observations correspond to every edge in the Nomography Graph and specify that adjusted homographies should be close to the original ones. Temporal stability observations correspond to every simple cycle in the Nomography Graph and specify that the composition of homographies along this cycle is identity. Drift compensation observations correspond to the homography between distant (in time) frames and specify that the homography is close to the composition of homographies along the path between these distant frames. Observations are given weights. Weights are based on the reliability of the computed homography, namely on the number of outlier pixels. The larger number of outliers, the less reliable the homography and the lower the weight of corresponding observation. Once the optimization problem is formulated in terms of states and observations, the Nomography Graph can be determined, for example by a non-linear least squares analysis, such as the Levenberg-Marquardt algorithm.

By the method above we have now defined the motion, or apparent motion, of an object in a sequence of two eye views, over two frames in each view. The homography graph is extensible. Firstly we can compute the homography of frames L,t=1 and R,t=1 to L,t=n and R,t=n, which may be typically up to 100 frames. There are various methods here. This may be computed for frames L,t=1 and R,t=1 to L,t=100 and R,t=100. This may be carried out in sections, e.g., t=1 to t=5, t=6 to t=10 and so on, or at a lower temporal frequency (each $5^{th}$ frame) or, as a combination of the two.

It is important to allow the operator to 'edit' the determined motion or shape of the object. This is done by the insertion of extra 'key frames'. It is important to realize that a key frame may be defined in either the L eye stream, or the R eye stream, or in both at the same time. Thus in one example, the operator might have inserted a new key frame. For each of the defined control points on the originally determined path, to the actual operator specified position, there will be an offset in x and y. This linear transformation, mapping (x,y) to (x',y') can be applied first to the points in question, then this new (x',y') can be transformed using the previously determined homography. There is no requirement to recalculate any homographies.

The final step in the process is to export the tracked shape so that a subsequent compositing system can combine or modify the object in question. The simplest form of export is as a binary rasterized image, where black represents 'no object' and white represents 'object'. Essentially this image is a 'key'. Other forms of key may have 'grey' or 'feathered' edges, and be represented by grey levels, not just a binary key. Note that the keying or compositing needs to be done in image space, whereas the tracking has been taking place in projective space. The mapping of image space to projective space (and vice versa) can be as simple as a 3×3 matrix. In practice, it may be desirable to have a more complex 'lens' model that captures not just the perfection of the lens, but also its imperfections, such as radial distortion, sometimes using a bigger matrix or other mathematical description. This type of a model can be used to correct for lens distortion, for example to more closely match a pair of lenses used for recording stereo images.

More useful forms of export can be to export the shape of the key as a vector file, which can allow its use at different resolutions of image, requires less storage space and is faster to compute.

In a refinement of the use of key frames described above the hero view (which may be either the left or the right eye view) is used for all detailed rotoscoping and the changes that are made, as defined in key frames of the hero view becomes a 'master' for modifications of both the hero view and non-hero view. The artist may need to have a single eye view (i.e. the hero view) with modifications that are approved by a manager, with the second eye view then being matched to the approved changes. In this situation it is clearly important for any adjustments made when processing the non-hero to have no impact on the hero view. Yet it is also important to allow for further adjustments to the hero view if required at a later stage. This supports a very common workflow where the hero view is "signed off" as being correct before the non-hero view is worked on, meaning that artists need to be confident that corrections they make in a non-hero view do not change the already accepted work.

This issue is addressed by an interpolation scheme designed for stereo (or any multi-view) key framing. A key concept is that the user may do all their detailed rotoscoping work (or other image processing) in the hero view and then switch to a non-hero view where the shape has been transferred automatically. If they need to make adjustments to the shape in the non-hero view, for example to account for non-planar effects, then they can add additional shape key frames in the non-hero view. With the proposed scheme these key frames do not modify the hero view, but further hero view modifications will affect the non-hero view.

The key frame will include control points such as spline control points. On a non-key frame, the position of any given control point is determined by interpolation from the two nearest key frames in time. For example, there may be keyframes at t=0 and t=10, and wish to compute the position of a spline point at t=7. The homographies for all the frames involved are known since that have been computed using the planar tracker as described above. The inverse homography can be used to warp the control point position in each of the key frames into a reference frame. Then this is linearly interpolated between the two key frames according to the time position between them, in this case we would take 30% of t=0 and 70% of t=10. Then we use the homography for t=7 to warp the interpolated position into the image frame for t=7.

In the stereo case with the left eye view (L) denoted as the hero view, the key frames could be L,t=0 and L,t=10 whereas the target frame could be in the non hero (right eye) view at t=7, hence frame R,t=7. With the proposed process the interpolation proceeds in the same way, and nearest keyframes in time are used, even if they are in another view, provided that other view is the hero. If there are key frames that are closer in time but in another view that is the non-hero view then they are not used. Hence, if there is another key frame, this time at R,t=5, then interpolation of R,t=7 would use key frames R,t=5 and L,t=10 since these are the closest key frames in time and although L,t=10 is from another view this is acceptable since in this case L is the hero view. However, interpolation for L,t=7 would still use L,t=0 and L,t=10, because the key frame R, t=5, is in another view that is a non-hero view. This system means that any changes to the non-hero view will not affect later changes to the hero view, but later changes to the hero view will affect the non-hero view. Also, changes for any given view will always be taken into account during later changes to the same view.

A further tool that can be used, in adapted form, with the proposed processing system is a tool known as "Adjust-Track" in the Mocha® product for processing monoscopic images. This is a tool that allows the user to add manual observations of visible points in the image in several frames, to correct for drift. For example, if the user was tracking a TV screen over a long shot, where the camera pans slowly, drift may accumulate over the shot. To fix this, the user visits one frame and positions four reference points. This involves placing a marker on some obvious visible point in the scene, for example the corners of the TV screen, knobs on the front, etc. They then move to another frame in the sequence, where the drift is visible, and move the markers to align with the same points in the scene again. This can be repeated as many times as necessary, and it is also possible to define a subset of the four markers on any one frame, provided all four are defined in at least two frames. This extra information is used to correct the drift by means of an appropriate correction via an appropriate homography.

The technique can be used for each sequence of frames in a set of stereoscopic frames. If two stereo cameras are used then the corrections for drift in a hero view may be copied across to the non-hero view, assuming that any drift affects both cameras in the same manner. Further adjustments could be made in the non-hero view as required. It may be useful to apply the same system for interaction between non-hero and hero view corrections as is used for key frames in the manner described above, such that changes to the hero view may affect the non-hero view, but changes to the non-hero view cannot affect the hero view.

Whilst we have here described the use of Homographies from two camera views, all of the above principles work with three (or more) camera views. With three cameras, we use two homographies, one to relate the first camera to the second, and the other to relate the second camera to the third. Thus, in general, for n cameras, there will be n-1 Nomography sets.

There are many 'use cases' of the above stereo tracking. A first possibility is for correction of vertical misalignment of camera pairs. In recording material for stereo, ideally both cameras should have an exact alignment in the vertical direction. However, it is not always possible to perfectly align the cameras, and in a worse case one camera may move slightly in relation to the other and become misaligned whilst the recording is taking place. Many techniques are known for 'fixing' this, including the 'Ocula' tool, sold by the Foundry Visionmongers Ltd of London. All previously known techniques utilize disparity map techniques, and we have already described the disadvantages of disparity techniques. The homography techniques proposed above can be used here and this is a more efficient method than the use of disparity maps.

An example technique for doing this is for the operator to find a non moving reference plane (the wall of a building for example) and to track this over time. From this it is possible to generate the Nomography Graph between the two cameras. We can calculate camera pan (x dimension), translation, and perspective. For the cameras to be perfectly aligned there would be no y (vertical dimension) movement, or rotation. A suitable homography can be determined to make the y dimension zero, and this homography can be used to warp of the eye views to effectively realign the cameras relative to each other in the vertical axis.

A second possible application is for object removal. Here we want to replace an object with the naturally occurring background behind that object, to make the object disappear all together. One example here may be the removal of a boom microphone that unintentionally appears in the shot. Naturally, in any one frame, if we remove an object, we do not know what the background behind that object is. However, by the use of information both from two (or more) cameras, and from different time intervals, we often see the whole of the background concerned. Multiple camera views will inevitably provide a greater amount of information about the background than a single camera view. By the use of the object shape at every time interval, from two (or more) cameras, together with sufficient logic, it is possible to automate the removal of background objects. The same type of process can of course be adapted for other rotoscoping processes, including modifying an object by applying special effects.

A third possible application is where it is desired to know the exact path of a camera in 3D space. The need for this is to be able to generate the correct 'view' of, for example, a 3D CGI monster. This is often referred to as a '3D Camera Solver'. In this mode, the operator will choose one (or more) reference points in a scene that are known not to move—for example a brick wall, or the side of a church spire. We can use homographies as described earlier to track the 'apparent' movement of these reference object(s). We know that since these objects have not moved in the real world, then all perceived movement is actually due to camera movement. Thus using the inverse homography, we determine the camera path in 3D. We have found that for camera motion that involves only pan tilt or zoom, only one reference plane is needed. However for a full 'six degrees' of movement, involving, say camera 'dallying', two objects are needed. In some scenes it is difficult to find two distinct reference items. However, this is not a problem for the current method since we can use two different camera views at the same time interval as reference points, using the techniques described above. These may be two principal cameras, if the production is to be made in stereo, or they may be lower resolution 'witness' cameras.

Once the motion of the camera has been solved, the technique can also be used to discover the 3D motion of any objects which move in the scene. For example, if the production wishes to add a CGI hat onto an actor, it will be necessary to first solve the camera motion, then subsequently solve the motion or the actor's head relative to the camera, so that the hat may be correctly positioned and give a convincing illusion of reality.

It is often found these days that productions involve continuously running 'witness' cameras, as a record of the day's shoot. It is also more and more common to see the use of high-resolution still SLR cameras to record production 'stills'. These still frames, if the time at which they were shot is known approximately, can also be used as information for homography determination. An advantage here is that Digital SLR cameras in still frame mode often have a higher resolution than Digital Cinematography cameras. The higher spatial accuracy from the higher resolution recording gives a more precise determination of the camera position, and a better 'solve'. To compute an accurate camera solution bundle adjustment techniques can be applied.

Further uses are also possible. It will be appreciated that the use of homographies for multiple camera views of the same scene can enhance processing of images for almost any type of processing that, in the prior art, uses 2D planar tracking. The additional camera view provides extra information that can be used in any suitable way once it has been linked to the hero or main camera view via homography as described above.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for processing of motion images based on a first set of motion image frames for a first eye view and at least one image frame for a second eye view, the method comprising:
   identifying an object in a first image frame from the first eye view at a given time t;
   using a planar tracker, generating a plurality of homographies for a particular plane, each of the homographies being generated for a different view with respect to the particular plane, at least one of the homographies relating to apparent movement of the object between the first image frame from the first eye view at the given time t to a first image frame from the second eye view at a similar time t'; and
   enhancing processing of image(s) in the first and/or the second eye view using the homographies,
   wherein the method is used for processing of stereo images that include a first set of motion image frames for the first eye view and a second set of motion image frames for the second eye view,
   wherein, using the planar tracker, a set of homographies is determined that relate to apparent movement of the object, and
   wherein the method further comprises tracking the object from the first image frame from the first eye view at first time to the second image frame from the second eye view at a second time by two routes, the first route using a first subset of the set of homographies and the second route using a second subset of the set of homographies, and examining results of the tracking to determine if an adjustment to any of the homographies in the set of homographies is to be made.

2. A method as claimed in claim 1, wherein the motion image comprises two sets of motion image frames representing the first and second eye views.

3. A method as claimed in claim 2, wherein the motion images further comprise one or more image frames for additional eye views, and wherein the one or more image frames for the additional eye views comprise witness camera images.

4. A method as claimed in claim 3, wherein the difference between time t and time t' is less than a period between the motion image frames for the first eye view.

5. A method as claimed in claim 1, wherein the image frames for the second eye view or any additional eye views comprise witness camera images.

6. A method as claimed in claim 1, wherein the difference between time t and time t' is less than a period between the motion image frames for the first eye view.

7. A method as claimed in claim 1, wherein the stereo images have the same frame rate.

8. A method as claimed in claim 7, wherein, using the planar tracker, the set of homographies is determined that relate to apparent movement of the object: (i) from the first image frame from the first eye view at the given time t to a second image frame from the first eye view at a different time t+n, (ii) from the first image frame from the first eye view at the given time t to a first image frame from the second eye view at a similar time t', (iii) from the second image frame from the first eye view at the different time t+n to a second image frame from the second eye view at a time t'+n, and (iv) from the first image frame from the second eye view at the time t' to the second image frame from the second eye view at a time t'+n; with each of these four homographies for (i) to (iv) being used to enhance processing of the images.

9. A method as claimed in claim 1, wherein the image frames comprise the first set of motion image frames for the first eye view and a second set of image frames for the second eye view, and wherein the method comprises: designating one eye view as a hero view; processing the images by the use of key frames that are edited by user-defined effects wherein frames that are not key frames are edited by interpolation from two key frames that are closest in time to the non-key frame of interest and wherein the key frames from another eye view are permitted to be key frames closest in time for the non-key frame of interest provided that the another eye view is the hero view.

10. A method as claimed in claim 9, wherein if there are key frames that are closest in time to the non-key frame of interest but are in another view that is not the hero view then these key frames are disregarded for the purposes of interpolation for non-key frames and the next closest key frame in the same view, or in another view that is the hero view, is used for interpolation.

11. A method as claimed in claim 1, wherein the motion images comprise multiple frames for each of at least two eye views and the method comprises generating a set of homographies mapping between frames from different eye views at a similar time and mapping between frames occurring sooner or later in sequence for the same eye view.

12. A method as claimed in claim 1, wherein the images are sourced from three or more eye views.

13. A method as claimed in claim 1, wherein the homographies are constrained using a homography graph.

14. A method as claimed in claim 1, wherein the homographies are adjusted using a homography graph.

15. A method as claimed in claim 1, wherein the method comprises:
generating a homography graph for the particular plane; and
constraining the homographies using the homography graph.

16. A method for processing of motion images based on a first set of motion image frames for a first eye view and at least one image frame for a second eye view, the method comprising:
identifying an object in a first image frame from the first eye view at a given time t;
using a planar tracker, generating a homography relating to apparent movement of the object between the first image frame from the first eye view at the given time t to a first image frame from the second eye view at a similar time t'; and
enhancing processing of image(s) in the first and/or the second eye view using the homography,
wherein the method is used for processing of stereo images that include a first set of motion image frames for the first eye view and a second set of motion image frames for the second eye view, and wherein the stereo images have the same frame rate,
wherein, using the planar tracker, a set of homographies is determined that relate to apparent movement of the object: (i) from the first image frame from the first eye view at the given time t to a second image frame from the first eye view at a different time t+n, (ii) from the first image frame from the first eye view at the given time t to a first image frame from the second eye view at a similar time t', (iii) from the second image frame from the first eye view at the different time t+n to a second image frame from the second eye view at a time t'+n, and (iv) from the first image frame from the second eye view at the time t' to the second image frame from the second eye view at a time t'+n; with each of these four homographies for (i) to (iv) being used to enhance processing of the images, and
wherein the method further comprises tracking the object from the first image frame from the first eye view at the given time t to the second image frame from the second eye view at the time t'+n by two routes, the first being a combination of homographies for (i) and (iii) and the second being a combination of homographies for (ii) and (iv), wherein the results of the two combinations of homographies are compared and the comparison used to determine if an adjustment is required to any of the homographies for (i) to (iv).

17. A method as claimed in claim 16, wherein the homographies for (i) to (iv) are optimized by adjusting them such that the combined homography for a cycle through the four image frames is an identity, or is as close to an identity as possible.

18. A data processing apparatus comprising:
memory for storage of image data including a first set of motion image frames for a first eye view and at least one image frame for a second eye view;
a processor configured to identify an object in a first image frame from the first eye view at a given time t; and
a planar tracker to generate a plurality of homographies for a particular plane, each of the homographies being generated for a different view with respect to the particular plane, at least one of the homographies relating to apparent movement of the object between the first image frame from the first eye view at the given time to a first image frame from the second eye view at a similar time t',
wherein one or more of the homographies are used to enhance processing of image(s) in the first and/or the second eye view,
wherein the processor processes stereo images that include a first set of motion image frames for the first eye view and a second set of motion image frames for the second eye view,
wherein, using the planar tracker, a set of homographies is determined that relate to apparent movement of the object, and
wherein the processor tracks the object from the first image frame from the first eye view at first time to the second image frame from the second eye view at a second time by two routes, the first route using a first subset of the set of homographies and the second route using a second subset of the set of homographies, and examining results of the tracking to determine if an adjustment to any of the homographies in the set of homographies is to be made.

19. A non-transitory computer readable medium including at least computer program code for processing of motion images, the motion images including a first set of motion image frames associated with a first eye view and a second set of motion image frames associated with a second eye view, the computer readable medium comprising:
computer program code for identifying an object in a first image frame from the first set of motion image frames at a given time t;
computer program code for generating a plurality of homographies for a particular plane, each of the homographies being generated for a different view with respect to the particular plane, at least one of the homographies relating to apparent movement of the object between the first image frame from the first set of motion image frames at the given time t and a first image frame from the second set of motion image frames at a similar time t';
computer program code for processing of stereo images that include a first set of motion image frames for the first eye view and a second set of motion image frames for the second eye view;
computer program code for determining a set of homographies that relate to apparent movement of the object;
computer program code for tracking the object from the first image frame from the first eye view at first time to the second image frame from the second eye view at a second time by two routes, the first route using a first subset of the set of homographies and the second route using a second subset of the set of homographies, and examining results of the tracking to determine if an adjustment to any of the homographies in the set of homographies is to be made; and
computer program code for using one or more of the homographies to enhance processing of one or more of the motion images.

20. A non-transitory computer readable medium as claimed in claim 19, wherein one or more of the homographies are constrained using at least one homography graph.

* * * * *